Aug. 30, 1932.  W. R. GILLIES  1,875,297
HEAT INSULATING MATERIAL
Filed Nov. 19, 1928  4 Sheets-Sheet 1
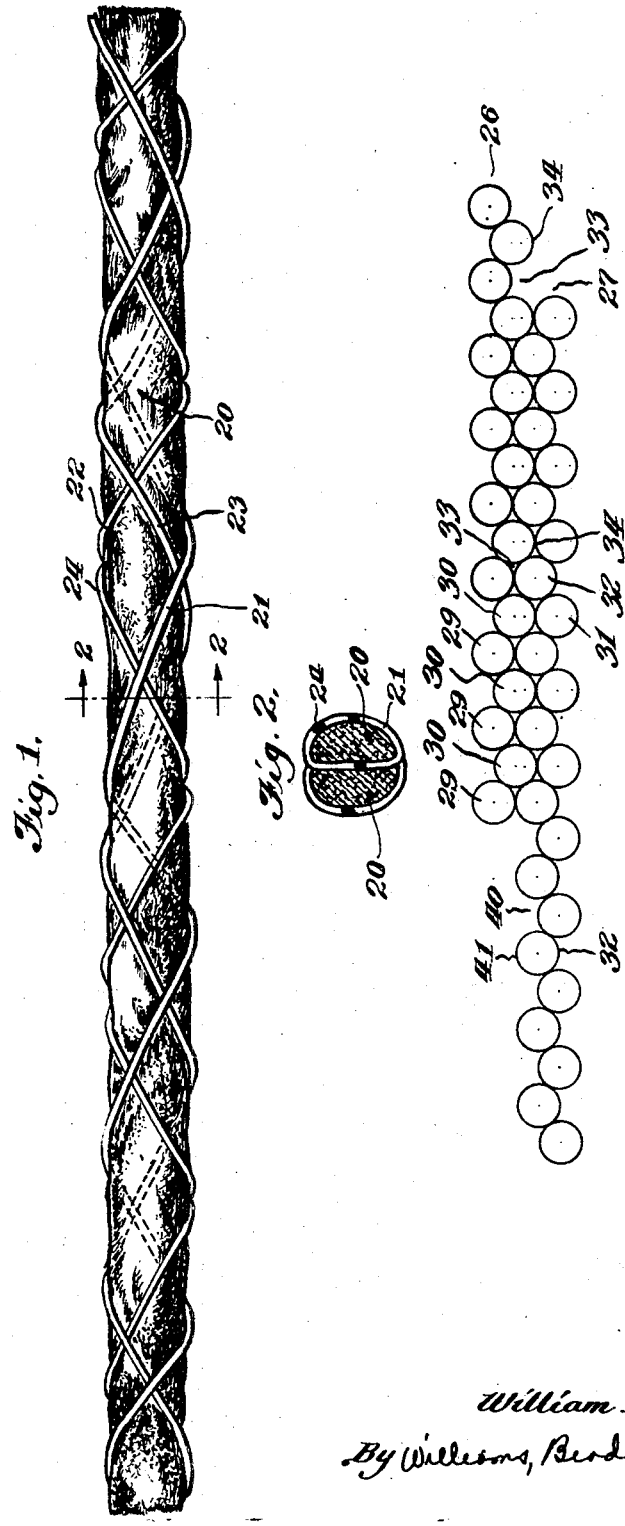
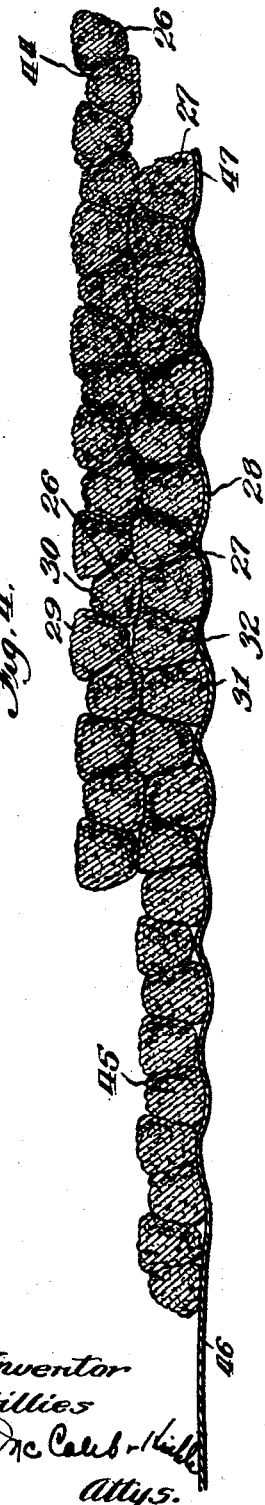
Inventor
William R. Gillies
By Williams, Bradbury, McCaleb-Hildy
Attys.

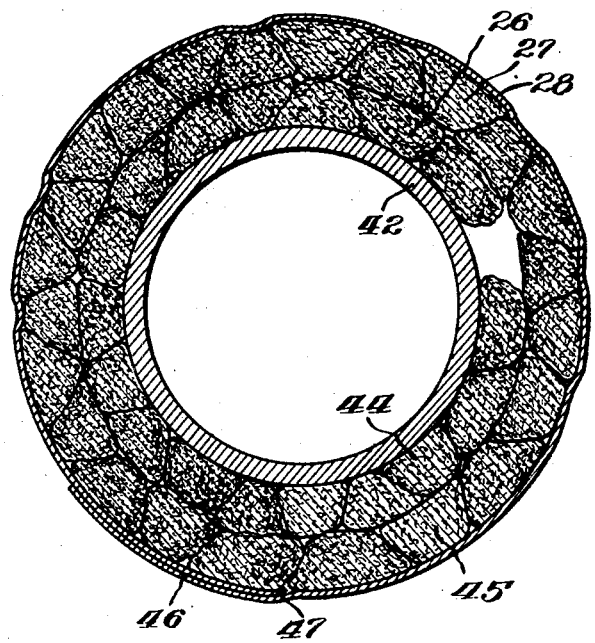
Fig. 7.
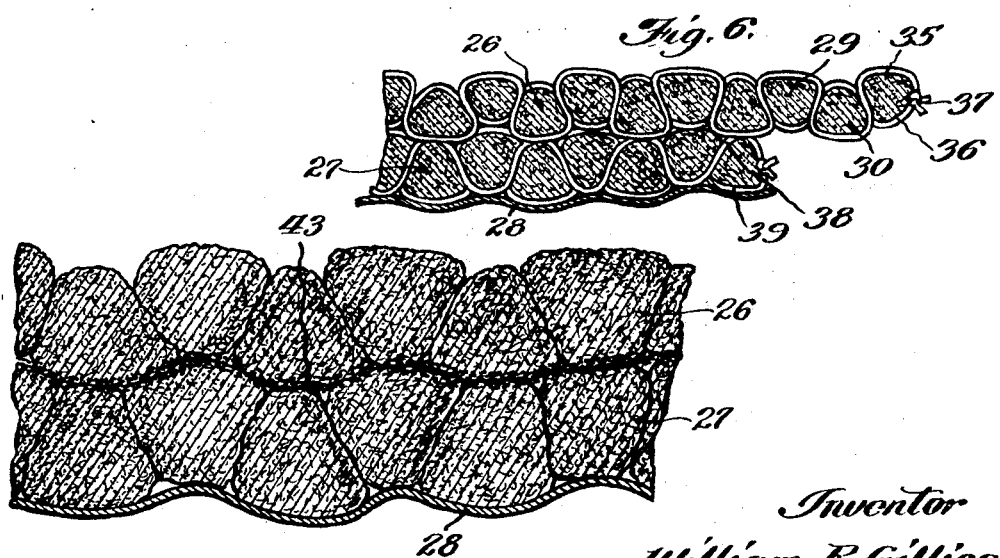
Fig. 6.
Fig. 5.

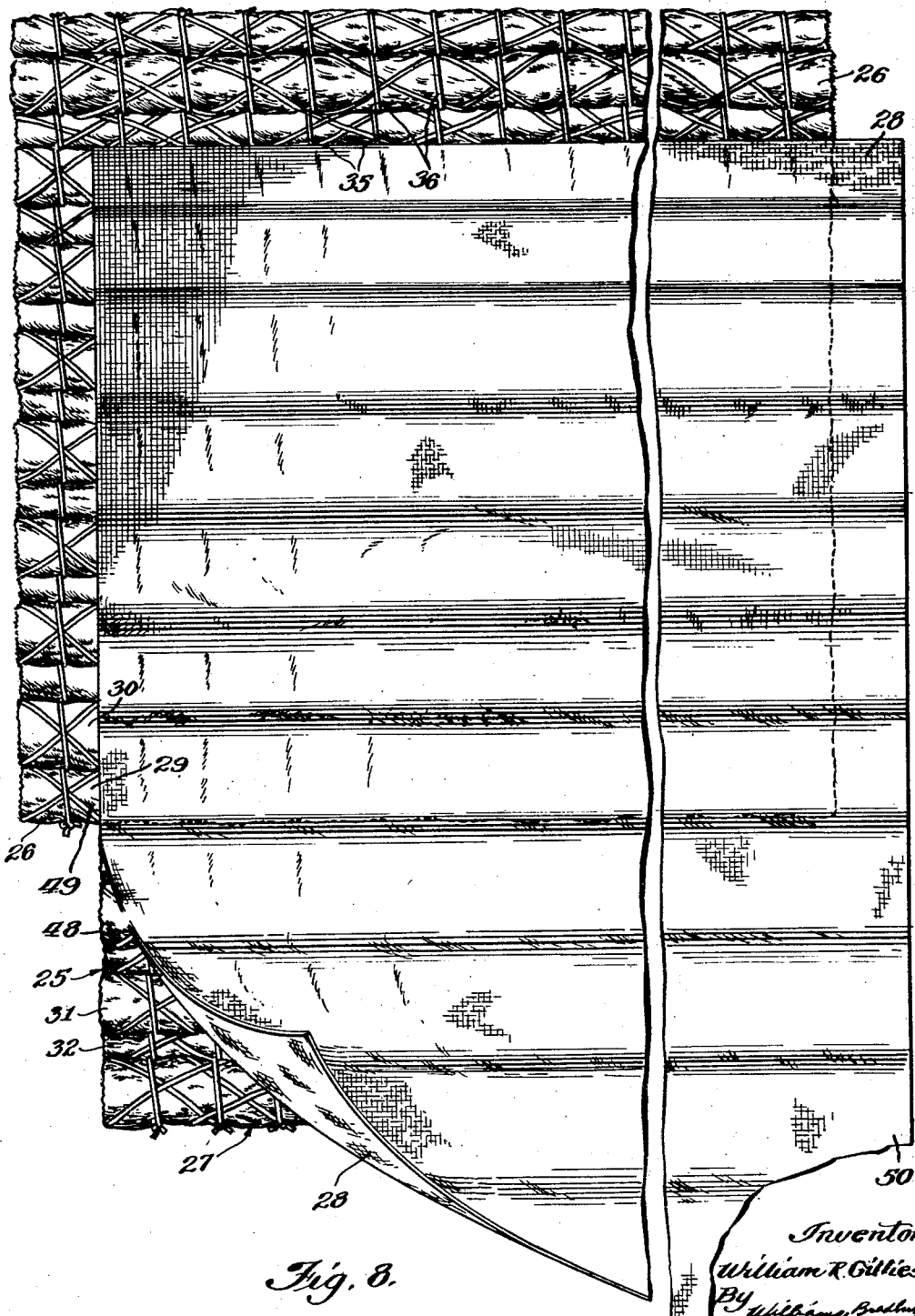

Aug. 30, 1932.  W. R. GILLIES  1,875,297
HEAT INSULATING MATERIAL
Filed Nov. 19, 1928   4 Sheets-Sheet 4
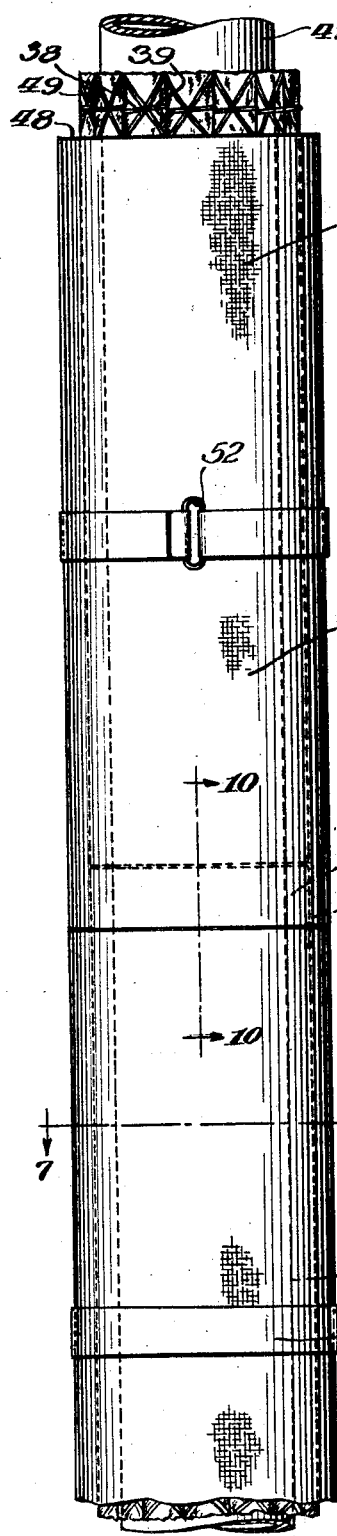
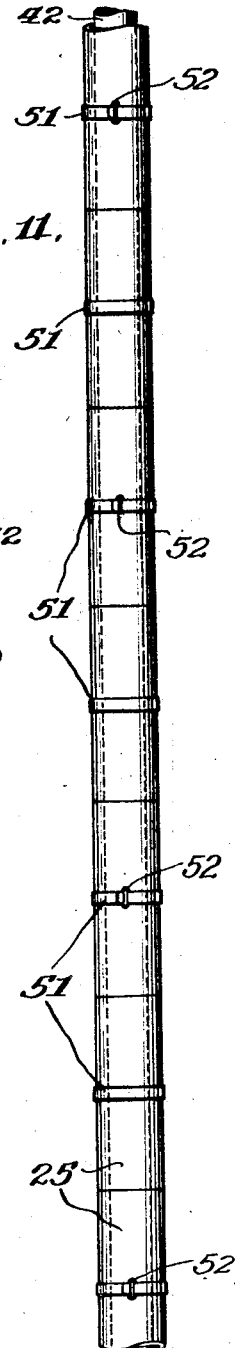
Inventor
William R. Gillies
By Williams, Bradbury, McCaleb & Hinkle
Attys.

Patented Aug. 30, 1932

1,875,297

UNITED STATES PATENT OFFICE

WILLIAM R. GILLIES, OF CHICAGO, ILLINOIS, ASSIGNOR TO UNION ASBESTOS AND RUBBER COMPANY, OF CHICAGO, ILLINOIS, A CORPORATION OF ILLINOIS

HEAT INSULATING MATERIAL

Application filed November 19, 1928. Serial No. 320,393.

The present invention relates to heat insulating material and is particularly concerned with heat insulating coverings for pipes and the like.

One of the objects of the invention is the provision of an improved heat insulating cover for pipes and other purposes, which is of uniform heat insulating quality throughout, including the joints between successive pieces of units.

Another object is the provision of a novel pipe covering unit with which the joints are automatically broken and overlapped in the installation of the covering.

Another object is the provision of a novel roving structure for use in flexible heat insulating material which is uniform in heat insulating quality, which is easily manufactured and which is more durable than the structures of the prior art.

Another object is the provision of a heat insulation composed of rovings of asbestos fibers, in which the cracks between the separate pieces of insulation are closed by other rovings of the same material forming a homogeneous closed covering of asbestos rovings.

Another object is the provision of a heat insulating covering comprising a plurality of layers of asbestos roving arranged in lateral overlapping relation to each other to eliminate any possibility of cracks extending through the covering by means of which heat might be lost.

Other objects and advantages of the invention will be apparent from the following description and from the following drawings in which similar characters of reference indicate similar parts throughout the several views.

Referring to the drawings, of which there are four sheets:

Fig. 1 is an enlarged view of one of the rovings or units of which the insulation is constructed;

Fig. 2 is a sectional view taken on the line 2—2 of Fig. 1;

Fig. 3 is a diagrammatic sectional view illustrating the mode of assembly of the rovings to form the finished insulation;

Fig. 4 is an actual sectional view of the insulation showing the actual location of the various rovings in a finished pipe covering;

Fig. 5 is a similar view of a portion of the insulating material on an enlarged scale;

Fig. 6 is a similar cross sectional view taken on the plane of several of the cords which form the woof of the insulating material;

Fig. 7 is a full sized sectional view of the insulation applied to a pipe;

Fig. 8 is a plan view of one of the units of insulating material spread out flat;

Fig. 9 is an elevational view of a pipe equipped with a covering of my insulating material;

Fig. 10 is a sectional view taken on the line 10—10 of Fig. 9;

Fig. 11 is a view similar to Fig. 9, showing a plurality of sections of my insulating material installed upon a pipe.

Referring to Figs. 1 and 2, 20 indicates in its entirety one of the rovings or ropes of which my insulating material is built up. The rovings 20 preferably consist of a plurality of longitudinally extending asbestos fibers which may be twisted or untwisted, and which are loosely held together by a plurality of asbestos cords 21, 22, 23 and 24, spiraled about each roving. Thus, beginning at the bottom of the roving 20, the asbestos cord 21 extends spirally counterclockwise of the roving and upward, being embedded slightly in the fibers of which the roving is composed, and the asbestos cord 22 may be spiraled in a similar manner and similar direction about the roving 20 spaced from the cord 21.

The asbestos cords 23 and 24 may be spiraled clockwise beginning at the bottom of Fig. 1, in such manner that they will cross the cords 21 and 22, and the cords thus arranged are adapted to hold the asbestos fibers of the roving whether they are twisted or spiraled or not, and the cords are also adapted to give the roving considerable tensile strength.

The roving which is used as a warp unit in the construction of my insulation, preferably comprises two of the rovings 20 laid side by side as shown in Fig. 2, each of the rovings having approximately the cross sectional shape of a semi-circle, and the term "roving"

is used in both the sense of a single unit of asbestos fibers or a unit built up of a pair of separate ropes, depending upon the particular construction of the embodiment to which they are applied.

Another advantage of the warp or filler unit described is the increased tensile strength of the unit. Such strength is essential, for example, wherever it is desired to draw a filler unit of one or more rovings into a covering, where the filler unit is to be handled by weaving machinery, wrapped on reels, or drawn from one point to another, as from reel to loom.

Referring to Figs. 3, 4 and 8, 25 indicates in its entirety one of the sections of insulating material peculiarly adapted to be applied to pipes as a heat insulating covering. The heat insulating section 25 preferably consists of at least a pair of layers 26 and 27 formed of separate rovings of the type shown in Fig. 2, and the outside of the section of insulation is preferably covered with a layer of fabric 28 in order to provide a finished appearance and to protect the rovings from disintegration. The rovings or ropes of which the layer 26 is composed are designated by the numerals 29 and 30, and the rovings of which the layer 27 is composed, by the numerals 31 and 32, the rovings having the same characters of reference belonging to the same class as regards location in the finished section of insulating material.

Fig. 3 is a diagrammatic view showing the theoretical location and actual assembly of the rovings 29 to 32 to form the section of insulation 25, and it will be noted that the rovings 29 are spaced from each other a distance which is not sufficient to receive the rovings 30 disposed between the rovings 29 and at one side thereof. In other words, the rovings 30 are wedged in the cracks between the rovings 29 in such manner as to overlap the rovings 29 upon each side, and the rovings similarly overlap the rovings 30. By thus arranging the rovings 29 and 30 in overlapping relation, I am enabled to construct a layer of insulation which has no cracks through which the air might circulate or a substantial amount of heat might escape, and the layer 26 thus formed has a plurality of longitudinally extending grooves 33 and longitudinally extending ridges 34 on the side adjacent the layer 27.

In order to secure the rovings 29 and 30 in assembled relation as shown in Figs. 3 and 4, I provide a plurality of transversely extending asbestos cords 35 and 36 which are knotted together adjacent one edge of the section of insulation as shown at 37, and which are looped alternately and loosely about each successive roving in the layer. Thus the cord 35 in Fig. 6 extends over one of the rovings 29, between said roving 29 and the adjacent roving 30, under said roving 30, upward between the roving 30 and the next roving 29, and so on across the section of insulation 25 to the opposite edge where it is knotted to the cord 36.

The cord 36 extends from the cord 37 under the roving 29 at the right-hand edge of Fig. 6, upward between said roving 29 and the next roving 30, over said roving 30, downward between the roving 30 and the next roving 29, and so on across the sheet of insulation to the opposite edge where it is knotted to cord 35. In order that the rovings 29 and 30 may be secured in the relation shown in Figs. 3, 4, 5 and 6, the cord 36 is substantially shorter than the cord 35 because the cord 35 must pass over a greater distance to loop around the extreme outer portion of the rovings 29 and 30, while the cord 36 loops over the inner portions of the rovings 29 and 30. In other words, the cord 36 may be drawn substantially tighter than the cord 35 to secure the rovings in the proper wedging and overlapping relation previously described.

Referring again to Fig. 3, the layer 27 of the section of insulation 25 is formed in a similar manner, of the rovings 32, and the rovings 31, these rovings being likewise arranged in overlapping or wedging relation to each other so that the cracks between the rovings 32 are closed by the rovings 31 and vice versa.

The rovings 31 and 32 are secured together by loosely looping a plurality of cords 38 and 39 alternately about successive rovings in a manner previously described with regard to layer 26 in Fig. 6, and the cord 38 of the layer 27 is substantially shorter or drawn tighter than the cord 39 to maintain the rovings in overlapping and wedging relation.

The layer 27 is likewise formed with a plurality of longitudinally extending grooves 40 and longitudinally extending ridges 41 formed by the rovings 32 on the side adjacent the layer 26, and the layers 26 and 27 may thus be placed together with the ridges 41 in the grooves 33 of the layer 26, and the ridges 34 of the layer 26 in the grooves 40 of the layer 27. It will thus be observed that the layers 26 and 27 are adapted to be fitted together with their respective rovings in overlapping relation to each other, and I have thus provided a sheet of insulating material having a plurality of layers of rovings disposed in overlapping relation.

Referring to Figs. 3 and 4, it will be observed that the layer 26 projects beyond the layer 27 by a distance approximately equal to three rovings at the right-hand end of the figures, while the layer 27 has approximately nine rovings projecting to the left beyond the extreme left-hand edge of the layer 26. As the layer 26 is intended to be applied immediately adjacent the pipe 42, this layer need not be so wide as the layer 27 which extends about both the pipe 42 and the layer 26. In other words, the width of the layers 26 and 27 is proportioned to the circumference of the finished installation at the point at which the layer is located. The layers 26 and 27 may be secured together as shown in Figs. 3 to 6 by a layer of heat resistive cement 43 (Fig. 5).

As the edge of the layer 26 projects beyond the edge of the layer 27 at one side, and the edge of the layer 27 projects beyond the layer 26 at the other side, these overlapping portions which are indicated in their entirety at 44 and 45 may lie upon each other when the insulation is arranged upon a pipe as shown in Fig. 7. The fabric 28 which is likewise secured to the outer surface of the layer 27 by means of heat resistive cement, is also provided with a laterally projecting portion 46 which is adapted to lap over the opposite edge 47 of the fabric when the insulation is disposed upon the pipe, and the portions 46 and 47 of the fabric may be secured together by cement or other convenient fastening means.

Referring to Figs. 8 and 9, it will be observed that the ends of the rovings 29 and 30 which compose the layer 26 project to the left beyond the edge 48 of the layer 27, while the layer 27 and fabric 28 project to the right beyond the layer 26 on the opposite end of the section of insulation 25. In other words, the fabric 28 is secured to the layer 27 with its edges coinciding substantially with the edges of the layer, but the layer 27 and fabric 28 are secured to the layer 26 in offset and parallel relation providing overlapping edges 49 at one end of the insulation and an overlapping portion 50 at the other end of insulation.

It will thus be observed that when the section of insulation 25 is disposed upon the pipe 42, the laterally projecting portion 44 is overlapped by the laterally projecting portion 45, making the insulation of uniform thickness throughout the entire circumference of the pipe and the overlapping portion 46 of the fabric may be used to secure the insulation in place. The insulation may also be secured by use of the conventional sheet metal straps 51 having their ends looped about the wires 52.

The insulation 25 will have the overlapping portion 49 projecting at its upper end (Fig. 9) and when the next section of insulation 25a is applied, the overlapping portion 50 at the lower end of the section 25a will automatically cover the portion 49 of the section 25, the two sections overlapping with broken joints and the rovings automatically fitting together substantially as shown in Figs. 3 and 7. Any number of sections 25 of insulation may thus be applied to a pipe, the sections being automatically overlapped with each other to provide a uniform thickness of insulation of uniform quality on every part of the pipe, making the finished insulation appear substantially as shown in Fig. 11.

When the insulation is drawn tightly about the pipe 42 as shown in Fig. 7, the rovings 29 to 32 become wedged more closely between each other as shown in Fig. 7, but the joints between successive rovings remain broken as shown in Fig. 3, and the insulation is of substantially uniform heat insulating quality.

It will thus be observed that I have invented a novel form of flexible heat insulating material for pipes and the like, and my insulation is composed of rovings of asbestos fibers which are located in lateral overlapping relation, thereby preventing the formation of cracks extending through the insulation between the rovings.

My insulation may be constructed in sections consisting of layers secured together in offset relation in such manner that overlapping portions are provided both at the ends and the sides of the sheet so that the insulation is of uniform thickness and quality over the entire surface of the article to be covered.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A unit for forming flexible heat insulating material comprising a roving having a plurality of loose longitudinally extending asbestos fibers and cords of asbestos extending spirally about said fibers and crossing each other to hold said fibers together.

2. A flexible heat insulating covering, comprising a plurality of rovings of asbestos fibers, and a plurality of cords extending transversely to said rovings and crossed between rovings, alternate rovings being disposed sufficiently close to each other so that the balance of said rovings overlap said alternate rovings when disposed between said alternate rovings.

3. A flexible heat insulating covering comprising a plurality of rovings of asbestos fibers, and a plurality of cords extending transversely to said rovings and crossed between rovings, one set of said cords being shorter than the other to maintain adjacent rovings in overlapping engagement.

4. A flexible heat insulating covering comprising a plurality of rovings of asbestos fibers, and a plurality of cords extending transversely to said rovings and crossed between rovings, said rovings being secured by said cords in overlapping engagement with each other.

5. A heat insulating covering including a pair of layers of flexible heat insulating material formed of rovings of asbestos fibers, the rovings of each layer being wedged in between each other, forming a plurality of longitudinal grooves and ridges, and the ridges of one layer being disposed in the grooves of the other.

6. In a heat insulating covering, the combination of a plurality of rovings of asbestos fibers, with asbestos cords spiraled about said rovings, said cords crossing each other, and said rovings being secured in laterally overlapping arrangement relative to each other.

7. A flexible heat insulating covering comprising a plurality of rovings of asbestos fibers, a plurality of cords extending transversely to said rovings and crossed between rovings, one set of said cords being shorter than the other to maintain adjacent rovings in overlapping engagement, said rovings forming one layer of the cover, and a second similar layer offset longitudinally from the first mentioned layer to form an overlapping pipe covering unit.

8. A heat insulating covering including a pair of layers of flexible heat insulating material formed of rovings of asbestos fibers, the rovings of each layer being wedged in between each other, forming a plurality of longitudinal grooves and ridges, and the ridges of one layer being disposed in the grooves of the other, a plurality of cords extending transversely to said rovings and crossed between said rovings, one set of said cords being shorter than the other to maintain the rovings in wedged relation, and a similar pair of layers of heat insulating material secured to the first pair of layers in offset relation.

9. In a heat insulating material, a unit comprising a large, loose, soft roving of asbestos fibers, said roving having a plurality of asbestos cords spirally wound about said roving in a right-hand direction, and a plurality of similar asbestos cords spirally wound about said roving in a left-hand direction, forming a network for retaining the fibers of said roving in a unit.

10. In a heat insulating material, a unit comprising a large, loose, soft roving of asbestos fibers, said roving having a plurality of asbestos cords spirally wound about said roving in a right-hand direction, a plurality of similar asbestos cords spirally wound about said roving in a left-hand direction, forming a network for retaining the fibers of said roving in a unit, and a multiplicity of similar units disposed in offset relation to each other, each unit overlapping two adjacent units and forming a substantially homogeneous heat insulating covering.

11. In a heat insulating material, a filler unit comprising a plurality of large, loose, soft rovings comprising asbestos fibers, said rovings extending longitudinally besides each other to form an elongated filler unit of predetermined cross sectional shape, and a plurality of asbestos cords spirally wound about said rovings and extending besides each other in the same direction about the rovings to confine the fibers of said rovings in predetermined shape and increase the tensile strength of said filler unit.

12. In a heat insulating material, a filler unit comprising a plurality of large, loose, soft rovings comprising asbestos fibers, said rovings extending longitudinally beside each other to form an elongated filler unit of predetermined cross sectional shape, and a plurality of asbestos cords spirally wound about said rovings and extending beside each other in the same direction about the rovings to confine the fibers of said rovings in predetermined shape and increase the tensile strength of said filler unit, said rovings overlapping each other and engaging each other in staggered arrangement to form a substantially flat filler of substantially uniform heat insulating characteristics.

In witness whereof, I hereunto subscribe my name this 14th day of November, 1928.

WILLIAM R. GILLIES.